Figure 1:
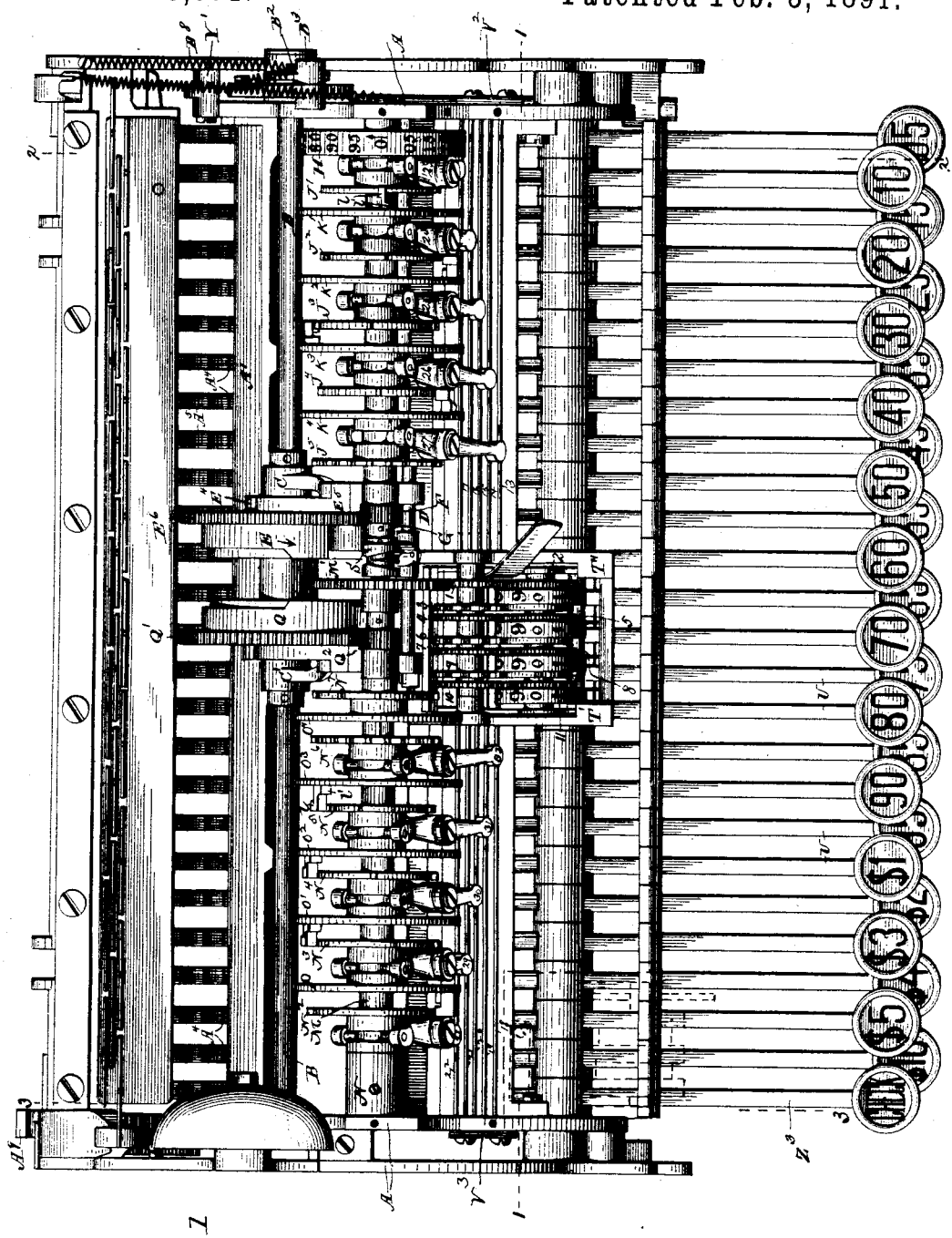

(No Model.) 8 Sheets—Sheet 1.

H. COOK.
CASH REGISTER AND INDICATOR.

No. 445,671. Patented Feb. 3, 1891.

Witnesses
E. W. Smith
Thomas Durant

Inventor
Hugo Cook
By his Attorneys (No Model.) 8 Sheets—Sheet 2.

H. COOK.
CASH REGISTER AND INDICATOR.

No. 445,671. Patented Feb. 3, 1891.

Witnesses
E. D. Smith
Thomas Durrant

Inventor
Hugo Cook.
By his Attorneys
Church & Church

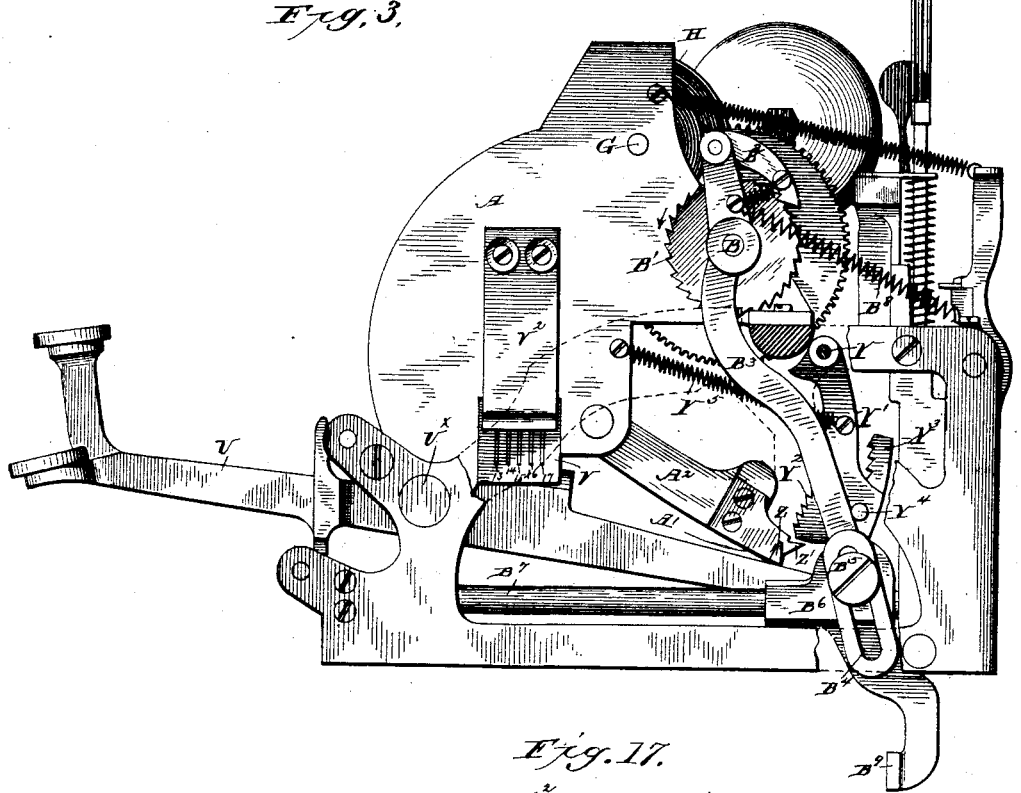
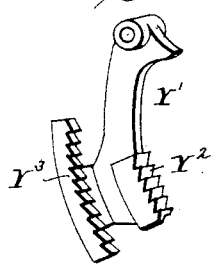
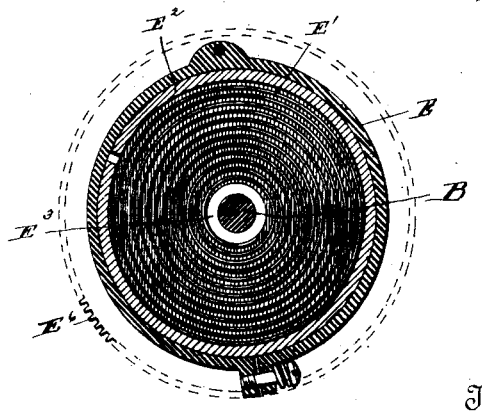

(No Model.) 8 Sheets—Sheet 4.

H. COOK.
CASH REGISTER AND INDICATOR.

No. 445,671. Patented Feb. 3, 1891.

Witnesses
E. D. Smith
Thomas Durant

Inventor
Hugo Cook
By his Attorneys
Church & Church (No Model.) 8 Sheets—Sheet 5.

H. COOK.
CASH REGISTER AND INDICATOR.

No. 445,671. Patented Feb. 3, 1891.

Witnesses
E. L. Smith
Thomas Durant

Inventor
Hugo Cook
By his Attorneys
Church & Church

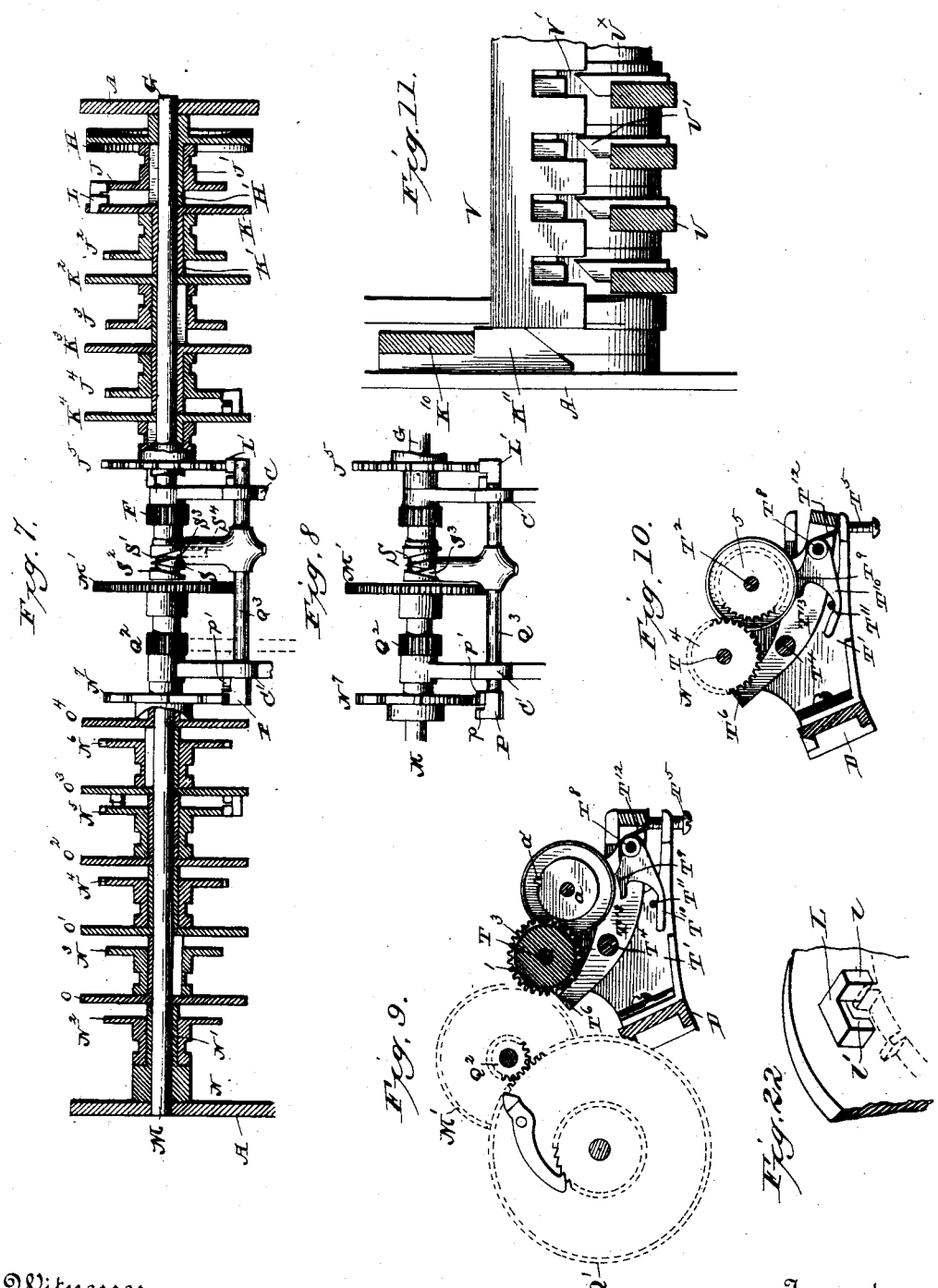

(No Model.) 8 Sheets—Sheet 7.
H. COOK.
CASH REGISTER AND INDICATOR.
No. 445,671. Patented Feb. 3, 1891.
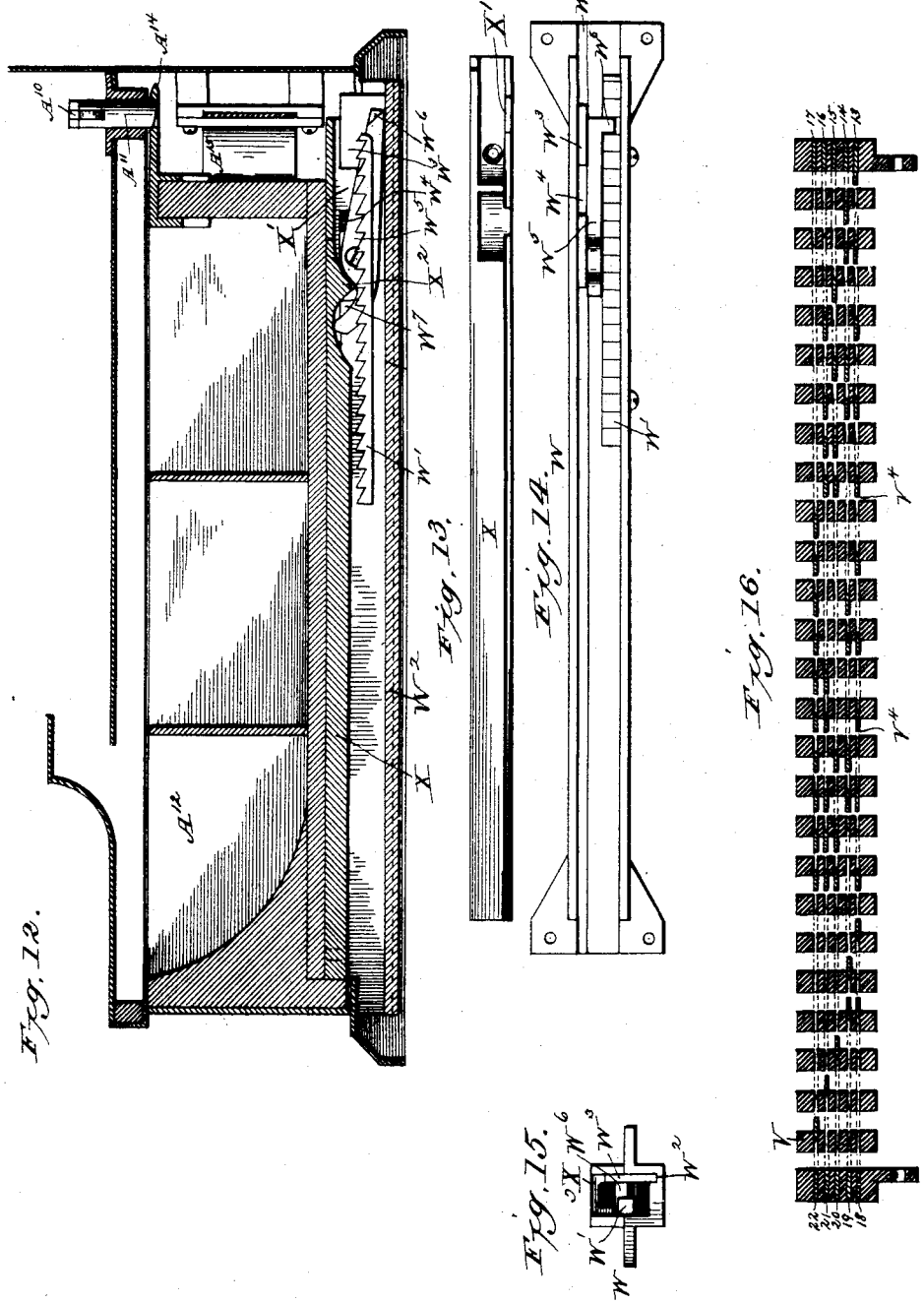
Witnesses
E. D. Smith
Thomas Durant
Inventor
Hugo Cook
By his Attorneys
Church & Church (No Model.) 8 Sheets—Sheet 8.
H. COOK.
CASH REGISTER AND INDICATOR.

No. 445,671. Patented Feb. 3, 1891.

Witnesses
E. L. Smith
Thomas Durant

Inventor
Hugo Cook
By his Attorneys
Church & Church

UNITED STATES PATENT OFFICE.

HUGO COOK, OF DAYTON, OHIO.

CASH REGISTER AND INDICATOR.

SPECIFICATION forming part of Letters Patent No. 445,671, dated February 3, 1891.

Application filed May 6, 1890. Serial No. 350,731. (No model.)

*To all whom it may concern:*

Be it known that I, HUGO COOK, a citizen of the United States, residing at Dayton, in the county of Montgomery and State of Ohio, have invented certain new and useful Improvements in Cash Registers and Indicators; and I do hereby declare the following to be a full, clear, and exact description of the same, reference being had to the accompanying drawings, forming a part of this specification.

My present invention may be said to be in some respects an improvement upon that for which Letters Patent No. 430,001 were issued to me June 10, 1890, and in others to be a new and independent invention. In both my present machine and that shown in my prior patent the registering-wheel is driven by a spring-impelled motor, which is normally held in check by an escapement mechanism under the control of the operating-keys of the machine in such manner that when a key of given value is operated the escapement mechanism which holds the motor in check is caused to release it and permit it to turn the registering-wheel a given distance and to then arrest it again. Upon operating a key of different value the motor is released and rearrested after having turned the registering-wheel a different distance, the adjustment of the parts in both cases being such that at each operation of a key the motor is permitted to turn the registering-wheel just far enough to register the value of the operated key. In both machines the escapement mechanism consists of a series of "detents" (so-called merely because they serve to detain a movable part,) and a series of escapements co-operating therewith. In both machines the detents are shown as supported upon wheels or disks, though the particular form of their support is immaterial, and the escapements are shown in the form of toothed wheels mounted upon the same axis as the detent-supports. In my first machine (the one shown in my prior patent) the detent-supports were under the direct influence of the motor and were held in check by the relatively non-revoluble escapement-wheels, so that when an escapement-wheel was moved toward and from its co-operating detent to disengage one of its teeth therefrom the detent and its support revolved until arrested by the next succeeding tooth of the escapement-wheel while the latter remained relatively stationary. In my present machine the escapement-wheel not only moves laterally toward and from its co-operating detent, but also revolves when one of its teeth is disengaged from the detent, while the latter remains relatively stationary. Between the specific forms of escapement mechanisms illustrated in my prior patent and in my present application there is therefore this difference, viz: In the former the revoluble detent co-operates with a relatively non-revolvable escapement-wheel, while in the latter a revoluble escapement-wheel co-operates with a relatively non-revoluble detent. This specific difference will be pointed out in some of the claims of my present application; but in its broader scope neither my former nor my present invention is restricted to the specific form of escapement mechanism illustrated. Where the escapements are in the form of wheels and the detents are mounted on the same axis, either the detent or the escapement may be the part which moves laterally and revolves relatively to the other. In my first machine the escapements and detents were mounted upon a fixed non-revoluble shaft, while in my present machine they are mounted upon a revoluble shaft. Improved results flow from the employment of the revoluble instead of the fixed shaft, and it forms one of the principal lines of distinction between my present and former machines. These as well as the various other features of my present invention will be hereinafter fully described, and specifically set forth in the claims.

Figure 2:
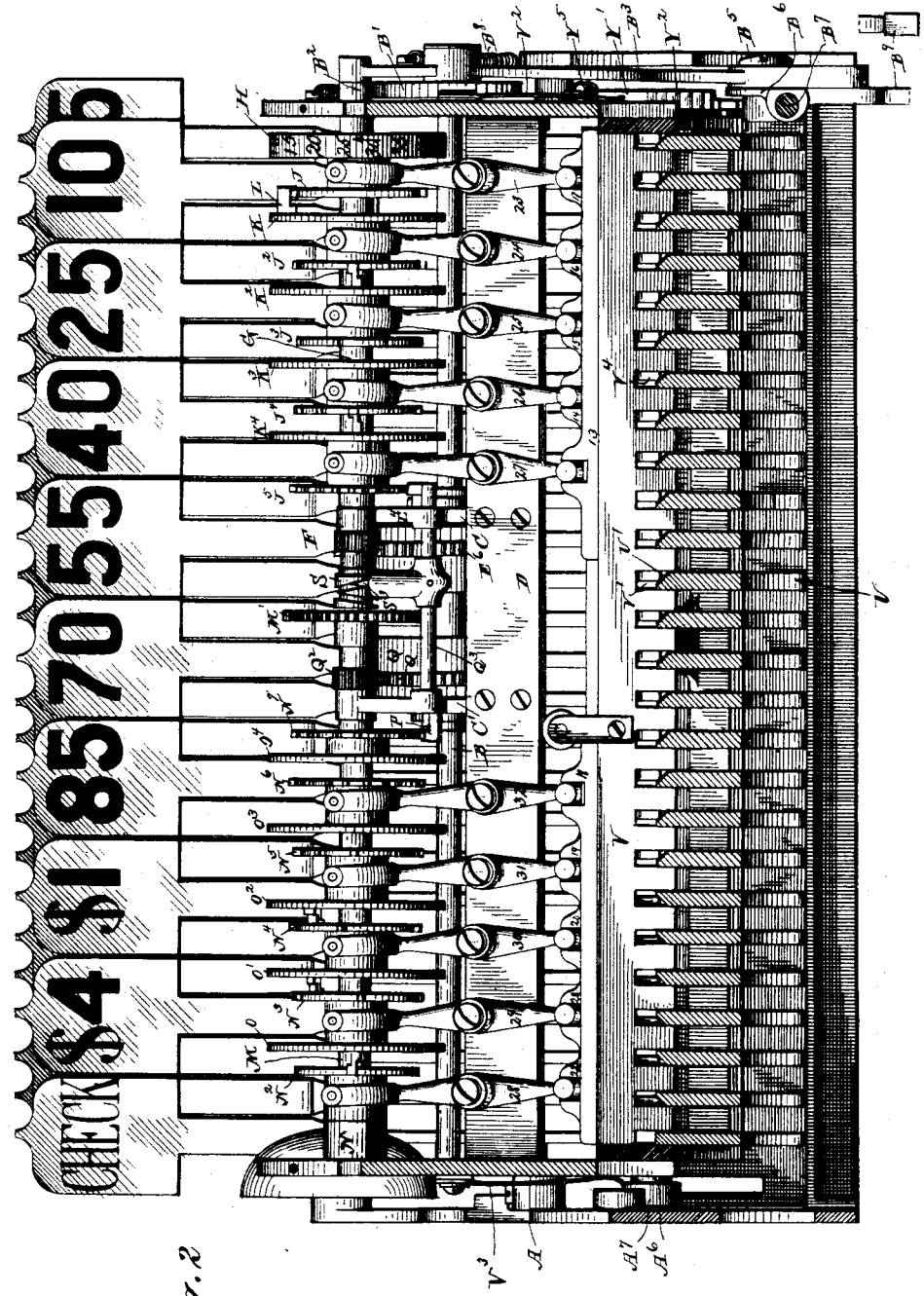
Figure 4:
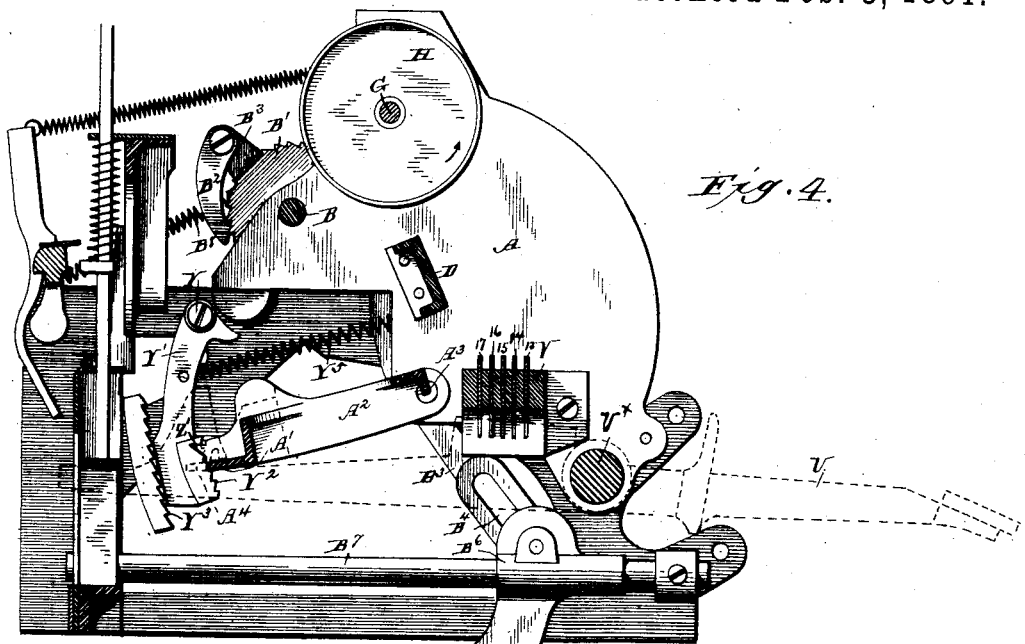
Figure 5:
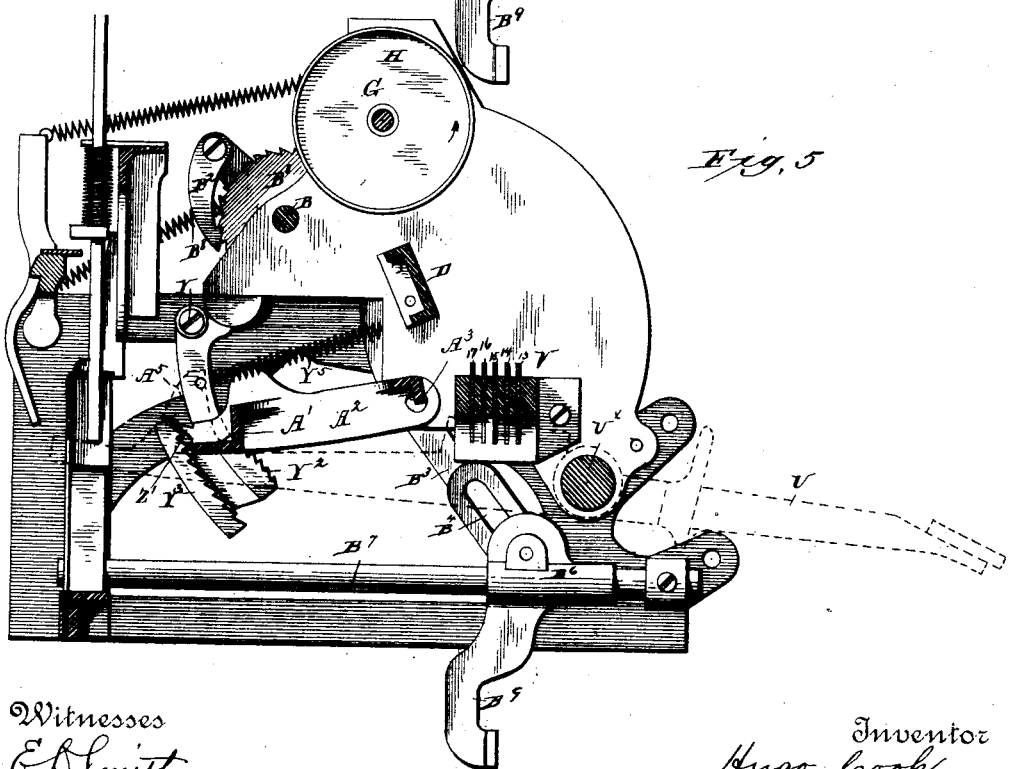
Figure 6:
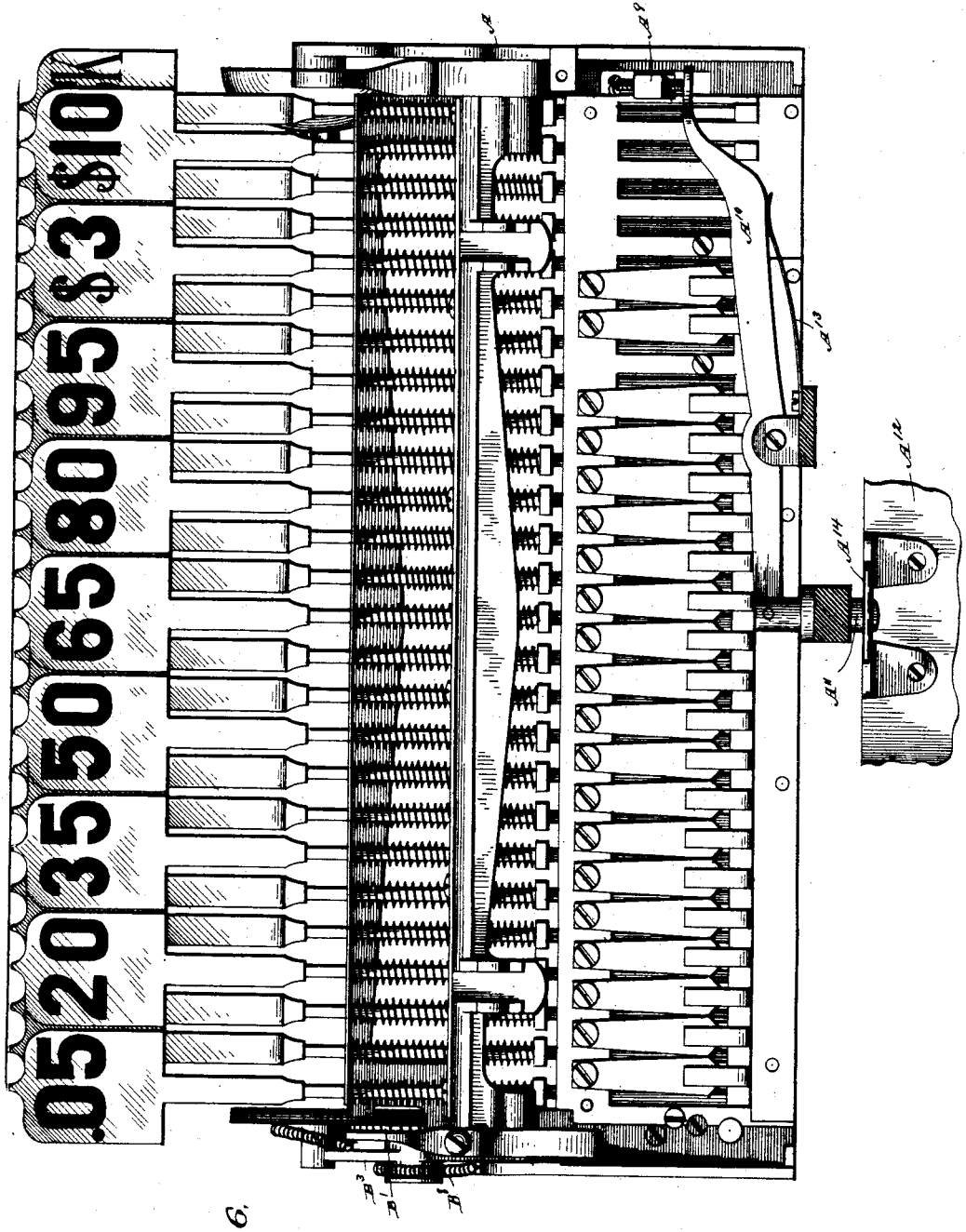
Figure 19:
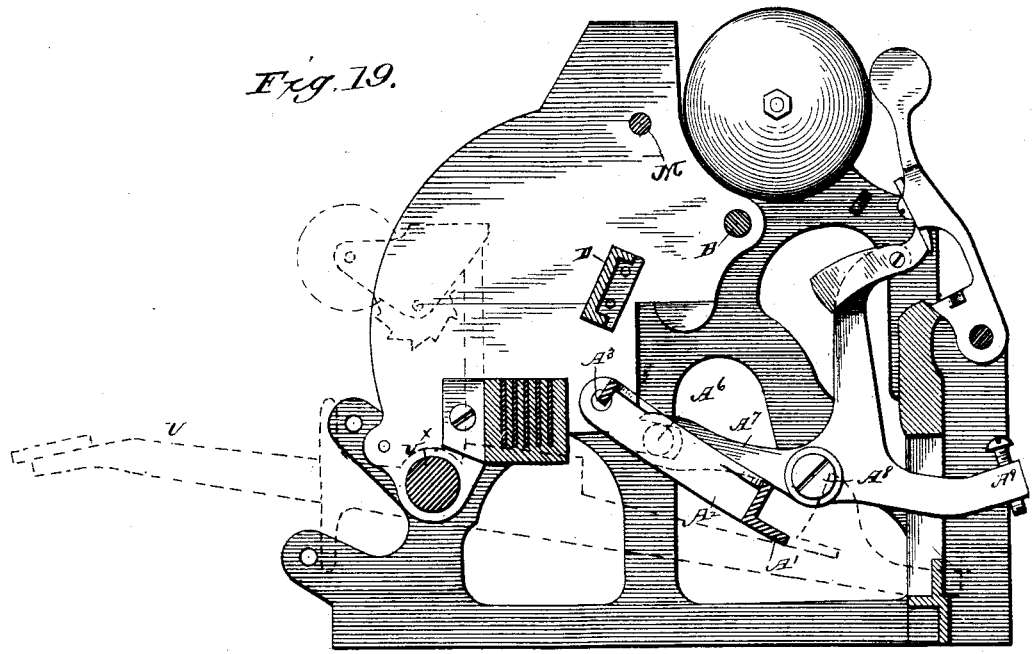
Figure 18:
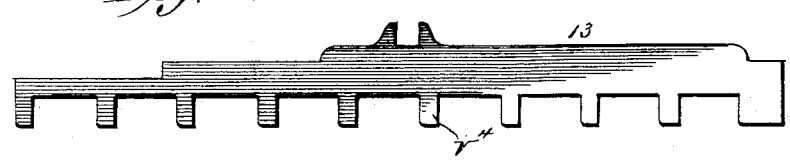
Figure 20:
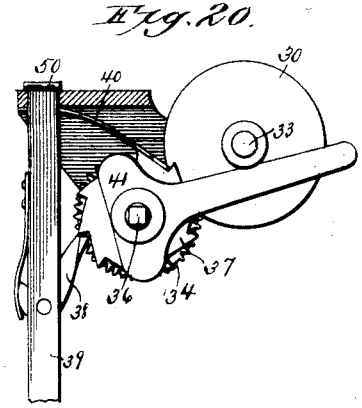
Figure 21:
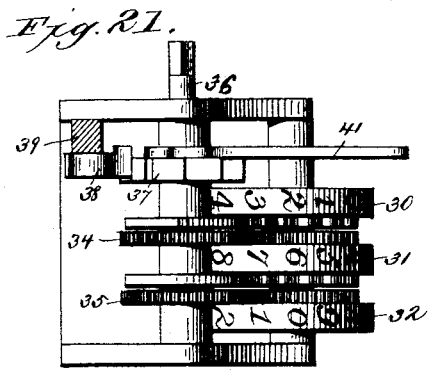

In the accompanying drawings, Figure 1 is a top plan view of the machine with the cabinet or casing removed. Fig. 2 is a sectional elevation taken on the line 1 1, Fig. 1. Fig. 3 is an end elevation of the machine; Fig. 3ª, a detail view of the key-arrester. Figs. 4 and 5 represent transverse sections taken on the line 2 2, Fig. 1, showing the key-arrester in different positions. Fig. 6 is a rear elevation of the machine, showing also a portion of the drawer and locking mechanism. Fig. 7 is a view, partly in section and partly in elevation, of the shafts of the cent-registering mechanism and the dollar-registering mechanism and the parts mounted thereupon. Fig. 8 is a detail view of the mechanism by which the amounts registered on the cents-registering mechanism are transferred to the dollar-registering mechanism. Figs. 9 and 10 are sectional detail views of the total-register, showing the parts in different positions. Fig. 11 is a detail view of the mechanism for restoring the slides to normal position. Fig. 12 is a longitudinal section through the drawer. Figs. 13, 14, and 15 are detail views of the mechanism for preventing the return of the drawer till it is fully opened. Fig. 16 is a longitudinal section through the slides. Fig. 17 is a sectional view of one of the spring-drums; Fig. 18, a view of one of the slides detached. Fig. 19 is a sectional view on the line 3 3, Fig. 1; and Figs. 20 and 21 are respectively a sectional elevation and a top plan view of the supplemental register. Fig. 22 is a perspective view of one of the detents and its support, the co-operating escapement-wheel being shown in dotted lines.

Similar letters of reference in the several figures indicate the same parts.

In the drawings, the letter A represents the main frame of the machine, constructed, preferably, of metal and of sufficient strength and rigidity to properly support the various operative parts. Extending from side to side of this frame is what may be termed a "motor-shaft" B, the same being supported by the end plates of the frame and also by two brackets C C', secured to a cross-bar D, as shown in Figs. 1 and 2, so as to permit said shaft to turn freely. Upon one end of this shaft B is secured a ratchet-wheel B', Fig. 3, with which is adapted to engage a spring-pressed pawl $B^2$, pivoted to the upper arm of a lever $B^3$, mounted loosely upon said shaft. The lower arm of the lever $B^3$ is slotted at $B^4$, and into this slot projects a stud or screw $B^5$, carried by a slide or traveler $B^6$, that is adapted to move back and forth upon a guide rod or way $B^7$. When the lower end of the lever $B^3$, guided by the slide $B^6$, is pushed toward the rear of the machine, the said lever is caused to swing upon the shaft B, and the pawl $B^2$, carried by its upper arm, causes the ratchet-wheel B' and with it the shaft B to be turned in the direction indicated by the arrow in Fig. 3; but as soon as the lever $B^3$ is released a spring $B^8$, connected at one end to the upper end of the lever and at the other end to a fixed part of the frame, swings the lever in the opposite direction and in position to impart through its pawl another impulse to the shaft B when again operated.

Mounted loosely upon the shaft B, near the middle thereof, Figs. 1 and 17, is a friction-drum E containing a coiled spring E', the outer end of which is connected to a split ring $E^2$, that bears with frictional contact against the inner circumference of the drum, and the inner end of which is connected to a sleeve $E^3$, fixed to and rotating with the shaft B, Fig. 17, and having a ratchet-wheel $E^4$ secured to it outside of the drum, as shown in Figs. 1 and 17. A pawl $E^5$, pivoted to the bracket C, is provided for engaging said ratchet-wheel. When the shaft B is rotated, the sleeve $E^3$, fixed to it, winds up the spring E', and the latter, through the friction-ring $E^2$, tends to rotate the drum in the direction indicated by the arrow in Fig. 1.

Secured to or formed upon the drum E is a gear-wheel $E^6$, which meshes with a pinion F, secured to a revoluble shaft G, that has its bearings at one end in the upper arm of the bracket C, and at the other end in the side plate of the frame, as shown in Figs. 1, 2, and 7.

Mounted fast upon the shaft G, near its right end, is a registering-wheel H, whose periphery is divided into twenty equal parts numbered from 0 to 95, respectively. This registering-wheel is provided with a hub or fixed sleeve H', Fig. 7, upon which is mounted the hub J' of what I term an "escapement-wheel" or "detent-arrester" J, a spline-and-groove connection being provided between the two, so as to cause both to turn together and yet enable the escapement-wheel to be moved laterally independently of the registering-wheel.

Mounted loosely upon the shaft G, adjacent the escapement-wheel J, is what I term a "detent-wheel" or "support" K, the same consisting of a disk provided with an elongated hub K', and carrying a detent L, which is adapted to engage with one or the other of the teeth of the escapement-wheel J. Upon the hub of this detent-wheel K is secured, by a spline-and-groove connection, another escapement-wheel $J^2$, which is adapted to co-operate in turn with another detent-wheel $K^2$, and following, in order, along the shaft are other escapement-wheels $J^3$, $J^4$, and $J^5$, and detent-wheels $K^3$ and $K^4$, co-operating with said escapement-wheels $J^3$ and $J^4$.

The escapement-wheel $J^5$, instead of co-operating with a detent L on a revoluble detent-wheel, as do all the other escapement-wheels in the series, co-operates with a fixed detent L' secured to the bracket C, as shown in Figs. 2, 7, and 8.

The spring-drum E tends to rotate the shaft G, the registering-wheel H secured to it, and the connected series of escapement-wheels J $J^2$ $J^3$ $J^4$ $J^5$, and detent-wheels K $K^2$ $K^3$ $K^4$ in the direction indicated by the arrow on the wheel H, and would so rotate said parts were it not for the fact that the stationary detent L' holds them in check.

By referring to Fig. 22 it will be seen that each of the detents L is provided with two contacting or engaging faces—that is to say, an outer face $l$ and an inner face $l'$. It is with the outer face $l$ that the tooth of each escapement-wheel is normally engaged; but whenever said wheel is moved laterally toward the face of its co-operating detent-wheel its tooth, which happens at the time to be engaged, passes out of the plane in which said outer face $l$ is located and into the plane into which stands the inner face $l'$, and under the influence of the spring-drum said escapement-wheel is advanced till its next succeeding tooth comes in contact with the said inner face $l'$, after which upon the outward or return movement of said escapement-wheel the said second tooth, which has so engaged said inner face $l'$ slips out of the plane in which said face is located and back into the plane of the outer face $l$, thus permitting the escapement-wheel to again advance till said second tooth comes in contact with said outer face $l$. From this description it will be seen that in order to advance an escapement-wheel a distance equal to the space between any two of its teeth the said escapement-wheel must be first moved laterally toward and then away from the co-operating detent-wheel upon which the detent is mounted.

Each of the escapement-wheels is assigned a particular value determined by the number of peripheral teeth with which it is provided. For instance, the escapement-wheel $J^5$ is called the five-cent wheel because it is provided with twenty equidistant teeth, and its operation is designed to effect the advance of the shaft G by twentieths of a revolution, each of which represents the twentieth of a dollar or five cents, as shown by the registering-wheel K, and a complete revolution of said shaft representing one dollar. In like manner the wheel $J^4$ is called the ten-cent wheel, because it has ten teeth; the wheel $J^3$ the twenty-cent wheel, because it has five teeth; the wheel $J^2$ the second twenty-cent wheel, because it also has five teeth, and the wheel J the fifty-cent wheel, because it has but two teeth.

If it should be desired to register five cents upon the registering-wheel, it would only be necessary to move the escapement-wheel $J^5$ laterally, so as to move its engaged tooth out of contact with the outer face $l$ of its co-operating stationary detent $L'$ and into the plane of the inner contacting face $l'$, whereupon, under the propelling action of the spring-drum, as transmitted through the whole series of escapement-wheels and detent-wheels and the shaft G, as before described, the said escapement-wheel $J^5$ will be advanced till its next or second tooth comes in contact with the said inner face $l'$ of the detent $L'$, and then upon a reverse or return lateral motion of said escapement-wheel said second tooth will be brought back again into the plane of the outer contacting face $l$, and by a further advance its said second tooth will be brought up into contact with said outer face $l$, thus effecting a complete movement of the escapement-wheel $J^2$, or, in other words, causing its advance a distance equal to the whole width of the space between two of its teeth. In like manner when it is desired to register ten cents, twenty cents, &c., the appropriate escapement-wheel is moved laterally toward and away from its co-operating detent-wheel, and said escapement-wheel advances the distance between two of its teeth, all the connected escapement-wheels and detent-wheels of higher denomination advancing with it, the escapement-wheel or lower denominations only not being affected.

The registering-wheel H, as we have seen, is adapted only to indicate the registering of amounts of five cents and multiples thereof up to ninety-five cents, and further provision of mechanism is therefore required, in order that sums of one dollar and multiples thereof may be registered, as well as that the complete revolutions of the cent-registering wheel H, each of which, of course, represents a dollar, may also be registered. Such additional mechanism is shown in the accompanying drawings, and is constructed as follows:

At the front of the machine and in line with the shaft G, Figs. 1, 2, 7, and 8, is another revoluble shaft M, which is a substantial counterpart of the shaft G, and has its bearings at one end in the side plate of the frame and near the other end in the bracket $C'$. Upon this shaft M is fixed a disk N, Fig. 7, having an elongated hub $N'$, and upon this hub and connected to it by a spline-and-groove connection, is an escapement-wheel $N^2$, with which is adapted to co-operate an adjacent detent-wheel O. Following along the shaft toward the middle of the machine are other escapement-wheels $N^3$ $N^4$ $N^5$ $N^6$ and their co-operating detent-wheels $O'$ $O^2$ $O^3$ $O^4$, the last-named detent-wheel $O^4$ being rigidly connected to an additional escapement-wheel $N^7$, which is adapted to engage with a detent P, mounted upon a sliding rod Q, supported in bearings in the brackets $C'$ C. The disk N in this series, being fixed to the shaft M, bears the same relation to the said shaft and to its associated escapement-wheels and detent-wheels as does the registering-wheel H to its corresponding associated parts on the shaft of the cent-registering mechanism, and the shaft M is kept under tension by means of a second spring-drum Q, mounted upon the shaft B and geared to the shaft M by means of a gear $Q'$ and pinion $Q^2$, all as shown in Figs. 1 and 2. Also mounted upon and secured to the shaft M is a gear-wheel $M'$, which meshes with the first of a train of registering-wheels 1 2 3 4 5 6 7 8 9 10 11, as shown.

The detent P, while mounted upon a sliding rod for a purpose hereinafter described, is, so far as its co-operation with the train of wheels $N^2$ O $N^3$ $O'$, &c., practically a stationary detent and holds said train in check against the impulse of the motor, just as the stationary detent $L'$ holds in check the train on the cent side of the machine. Inasmuch as the last escapement-wheel $N^7$ and the last detent-wheel $O^4$ are rigidly secured together and are loose on the shaft M, and are held stationary at all times, excepting when a transfer from the cent-wheel is being made in the manner hereinafter described, it follows that the detent on the wheel $O^4$, engaging the teeth of the escapement-wheel $N^6$, is really the end of the train of escapement mechanism on the shaft M, and in this respect corresponds to the stationary detent L' on the cent side of the machine.

The operations of the shaft M and the wheels mounted thereon in effecting the registry of dollars on the dollar-registering wheel would be the same if the escapement-wheel $N^7$ and detent-wheel $O^4$ were omitted and the detent on the latter were mounted upon the frame-work, as is the detent L'.

The escapement-wheel $N^6$ has twenty teeth and is adapted when released from its co-operating detent-wheel to permit the shaft M to rotate sufficiently to register one dollar on the train of registering-wheels 1 2, &c., while the escapement-wheels $N^5$ $N^4$ $N^3$ $N^2$ have ten, five, four, and two teeth respectively, and are adapted when operated to respectively cause two dollars, four dollars, five dollars, and ten dollars to be registered on said registering-train. The manner in which these escapement-wheels of the dollar-registering mechanism are shifted laterally to and from the detent-wheels is precisely the same as hereinbefore described in detailing the operation of the cent-registering mechanism, and does not therefore require further description.

The registering upon the dollar-registering mechanism of the number of complete revolutions of the cents-registering wheel and shaft, or, in other words, the transfer to and registration upon the dollar-registering mechanism of every dollar registered upon the cent-registering mechanism is effected in the following manner and by the following instrumentalities. (See Figs. 7 and 8.)

Upon the inner end of the shaft G of the cent-registering mechanism is rigidly secured a sleeve or collar S, provided with right and left spiral grooves S' $S^2$, in which works the edge of a head or piece $S^3$, that is mounted so as to turn freely upon its longitudinal axis in a socket $S^4$, secured rigidly to the sliding rod $Q^3$, that carries at its end the detent P, with which the additional escapement-wheel $N^7$ co-operates. Each time the shaft G of the cent-registering mechanism makes a complete revolution the head or piece $S^3$ is carried by one of the spiral grooves from right to left, thus moving the sliding rod $Q^3$ until the outer contact-face $p$ of the detent P is moved out of the path of the teeth of the escapement-wheel $N^7$, with which it has been engaged, and the inner contact-face $p'$ of said detent is brought into the path of the next succeeding tooth of said escapement-wheel, as shown in Fig. 8, thereby releasing one tooth of said escapement-wheel from the first-named contact-face and catching the next succeeding tooth on said last-named contact-face and permitting an advance of the escapement-wheel and of the shaft M of the dollar-registering mechanism, to which it is indirectly connected by means of the intervening detent-wheels and escapement-wheels a distance equal to half the distance between two of the teeth of said escapement-wheel $N^7$, and upon the next revolution of the cent-registering shaft G the other spiral groove will cause the head-piece $S^3$ to be shifted from left to right, and thereby move the detent P, so that its inner contact-face $p'$, now engaged with the second tooth of the escapement-wheel $N^7$, will be withdrawn out of the path of said tooth, and the latter will move forward against the outer contact-face $p'$, which has meanwhile been brought in its path, thus causing the further advance of the dollar-registering mechanism.

The escapement-wheel $N^7$ has but ten teeth, but inasmuch as it is advanced but half the distance between any two of its teeth at a time, the effect is the same as though it were provided with twenty teeth and operated like the escapement-wheel $N^6$.

As above described, the escapement-wheel $N^7$ is connected with the gear Q' of the second motor indirectly through the shaft M and the train of wheels mounted thereon; but it will be clear from the above description that such indirect connection of it to the motor is merely incidental to the employment of the shaft M and the dollar-train of wheels mounted thereon. The essential fact, so far as the transfer mechanism is concerned, is that the escapement-wheel is connected with the motor which actuates the dollar-wheel, so that when released by the detent P it will permit said motor to turn the dollar-registering wheel far enough to register one dollar thereon. The essential parts of this transfer mechanism are therefore the motor for driving the dollar-wheel, the escapement-wheel connected with it, and the detent which releases and arrests the escapement-wheel at proper intervals in the movements of the cent-registering wheel to permit the motor to actuate the dollar-registering wheel.

As before stated, the total register is geared to the dollar-shaft M by the gear M'. The upper set of gears 1 3 4 6 7 9 10 of this total-register are all mounted loosely upon a common shaft T, secured in fixed arms T' T', Figs. 1, 9, and 10, while the lower set of gears, 2, 5, 8, and 11 of said register, are mounted loosely upon a shaft $T^2$, secured in a swinging frame $T^3$, hung upon a shaft $T^4$, and adapted to be held in adjusted position by means of a screw $T^5$, or other equivalent adjusting device, as shown in Figs. 9 and 10. When the outer end of said frame $T^3$ is lowered by manipulating the screw $T^5$ or other adjusting device, the gears 2 5 8 11 carried by said frame are thrown out of mesh with gears 1 3 4 6 7 9 10, so as to enable said first-mentioned gears to be independently revolved and set, while at the same time a cross-bar $T^6$, at the rear of said frame, rises into engagement with the teeth of the gears 1 3 4 6 7 9 10, as shown in Fig. 10, and locks said gears from further rotation in either direction. The upward motion of the outer end of the frame $T^3$ again throws the two series of gears into mesh and withdraws the locking cross-bar from the upper series of gears, as will be readily understood.

In order that the gears 2, 5, 8, and 11 may not become displaced after they have once been set and before they are moved again into mesh with their co-operating gears, I provide each of said gears 2, 5, 8, and 11 with a frictional locking device consisting of a small bell-crank lever mounted loosely upon a cross-bar $T^8$ of the movable frame $T^3$, and having one of its arms (the upper one) formed with a friction-surface $T^9$ and its lower arm $T^{10}$ somewhat prolonged, so as to extend beneath a cross-bar $T^{11}$ extending between the fixed arms $T'$ $T'$. A spring $T^{12}$, applied to each of these bell-crank levers, operates normally to keep the long arm pressed upward against the fixed cross-bar $T^{11}$, and to keep its arm carrying the friction-surface $T^9$ in proximity to, though not in contact with, the surface of the registering-gear above it. When, however, the frame $T^3$ is lowered by manipulating the adjusting means $T^6$, the bell-crank levers are permitted a greater range of movement and their springs force the friction-surfaces $T^9$ in contact with their respective registering-wheels and hold them from moving except when positively turned by the operator in setting them. On the return of the frame $T^3$ to normal position the long arms $T^{10}$ of the levers strike the cross-bar $T^{11}$ and draw the friction-surfaces $T^9$ again out of contact with the registering-wheels. The gears 3 and 4 of the upper set are rigidly secured together and are practically the same as a single wide gear. The same is true of the gears 6 and 7 and the gears 9 and 10. The part 4 of the first gear meshes with the gear 5 of the second registering-wheel of the lower set, as shown in Fig. 1, while the part 3 of the gear is in the same plane as the transfer locking-disk $a$ secured on the left side of the first registering-wheel, Fig. 9. The periphery of the disk $a$ fits closely against the teeth of the gear 3 and prevents the latter being turned. The disk $a$ has a single tooth $a'$ on its periphery, and when the first registering-wheel has been turned one complete revolution this tooth enters between two of the teeth of the gear 3 and turns the latter, and the gear 4, rigid with the gear 3 and meshing with the gear 5 of the second registering-wheel, turns the latter one number and effects the transfer from the first registering-wheel. The gear 3 is mutilated, every third tooth being cut away, leaving its teeth in pairs with a space between each pair. This permits the gear to be turned by the tooth on the disk $a$, which at other times locks the gear from movement.

Each of the gears 6 and 9 is like the gear 3 and co-operates with a transfer locking-disk on the preceding registering-wheel of the lower set in the same manner. Inasmuch as it is impossible when the gears of the upper set are in mesh with those of the registering-wheels to turn the gears of the upper set except by the toothed disks $a$ on the wheels of the lower set, and inasmuch as the gears of the upper set are automatically locked by the rear cross-bar $T^6$ of the swinging frame, Figs. 9 and 10, whenever the wheels of the lower set are disengaged from them, it follows that the continued revolutions of the gears of the upper set, adding one onto the other, preserve an aggregate and unchangeable record of the revolutions of the wheels of the lower set, so that while the latter may be reset to zero the former cannot be, and by providing them with suitable numbers the total of all registrations made by the wheels of the lower set may be carried on those of the upper set indefinitely.

Having thus described the various parts of the registering mechanisms, it will be next in order to explain how said mechanisms are operated by the movements of the finger-keys. (See Figs. 1, 2, 3, 4, 5, 16, and 18.) The finger-keys are lettered U and are all mounted side by side, so as to turn freely upon a common shaft $U^x$, extending across the machine at the front, and they are provided on their outer ends with finger-buttons bearing numbers corresponding to the values to be registered, all as usual in this class of machines. Each key back of its pivotal point is provided with a wedge-shaped projection $U'$, Fig. 2, which works within a vertical slot $V'$, in what may be termed a "slide-box" V, extending transversely of the machine above the keys, the said wedge-shaped projection normally occupying the lower portion only of said vertical slot. Within the slide-box V are arranged two series of slides, one series 13 14 15 16 17 occupying with suitable intervening fixed spacing-plates, the right-hand end of the box beneath the cent-registering mechanisms, and the other series 18 19 20 21 22 occupying with their intervening spacing-plates the left-hand end of said box beneath the dollar-registering mechanism. The outer ends of the slides 13 14 15 16 17 project through the ends of the box, and against them bears a spring $V^2$, which tends to keep them retracted within the box though it permits them to move a limited distance outward against the tension of said spring. Another similar spring $V^3$ operates against the ends of the other series of slides 18 19 20 21 22. Each slide has portions of its under side cut away to form pendent lugs $V^4$, Fig. 18, there being one lug for each key with which the slide co-operates. Thus the slide 13 (shown in Fig. 18) is called the "five-cent slide" and co-operates with each odd-numbered key from 5 to 95, to shift the five-cent escapement-wheel $J^5$ in the manner hereinafter described, when any one of such keys is operated. As there are ten of such odd-numbered keys there are accordingly ten lugs $V^4$ on the under side of one slide 13, (shown in Fig. 18,) and one of these lugs projects from the right into the slot above each of said keys in the path of the wedge on said key. The lugs on the ten-cent slide 14 project into the slots of the ten, fifteen, thirty, thirty-five, sixty, sixty-five, eighty, and eighty-five cent keys, (see Fig. 16,) those on the twenty-cent slide 15 into the slots of the twenty, thirty, forty, forty-five, eighty, ninety, and ninety-five cent keys, those of the second twenty-cent slide 16 into the slots of the twenty-five, thirty-five, forty, forty-five, seventy, seventy-five, eighty-five, ninety, and ninety-five cent keys, while those on the fifty-cent slide 17 project into the slots of all of the keys from fifty to ninety-five cents, inclusive. It results from the above arrangement of the lugs on the slides that when the outer end of a key is depressed its wedge-shaped projection U' will rise up in the appropriate vertical slot V' and will encounter the projecting lug of one or more of the slides and force said slide or slides longitudinally against the tension of its retracting-spring, while the other slides will remain stationary, and upon the return movement of the key, and consequent withdrawal of the wedge-shaped projection, the said spring will again retract the slide or slides and return it or them to normal position. The movements of the slides 13 14 15 16 17 on the right-hand side of the machine are communicated, through centrally-pivoted vibrating levers 23 24 25 26 27, to the several escapement-wheels J' J² J³ J⁴ J⁵ of the cent-registering mechanism, while the movements of the slides 18 19 20 21 22 on the left-hand side of the machine are communicated through corresponding centrally-pivoted vibratory levers 28 29 30 31 32 to the several escapement-wheels N² N³ N⁴ N⁵ N⁶ of the dollar-registering mechanism, the lower end of each of said centrally-pivoted levers being connected by a hinged or flexible connection to the corresponding slide, and the upper end of said lever, which is preferably bifurcated or forked, co-operating within a peripheral groove in the hub of its corresponding escapement-wheel, as clearly shown in the drawings.

Assuming both the cent-registering wheel and the dollar-registering wheels to be set at zero, and that it is desired to register a five-cent sale, the operator presses upon the five-cent key, (marked with a large 5 in the drawings,) which causes the wedge-shaped projection on that key to move the slide 13 to the right against the tension of spring $v^2$ a distance sufficient to cause the vibratory lever 27 to shift the escapement-wheel J⁵ laterally, so as to disengage one of its teeth from the outer contact $l$ of the stationary detent L' and allow said escapement-wheel to turn till its next tooth comes in contact with the inner contact $l'$, and then upon the release of the key and its return to normal position the spring $v^2$ will again retract the slide 13, move the lever 27, and slide the escapement-wheel J⁵ back to first position, thus liberating the said second tooth of the escapement-wheel from the inner contact $l'$ of the detent and permitting it to advance to the outer contact $l$, the result being a total advance of the escapement-wheel the distance between two of its teeth, or, in other words, a distance equal to one-twentieth of a revolution of the shaft and the registration of five on the registering-wheel H.

If, instead of pressing the five-cent key, the fifty-five-cent key is pressed, the wedge-shaped projection on said fifty-five-cent key will operate not only the fifty-cent slide 17, but also at the same time the five-cent slide 13, the result being the movement of the vibratory levers 23 and 27, the shifting of both escapement-wheels J' and J⁵ and the consequent registration of fifty-five on the registering-wheel H.

When it is understood that the slide 13 operates the five-cent escapement-wheel J⁵, the slide 14 the ten-cent escapement-wheel J⁴, the slide 15 the twenty-cent escapement-wheel J³, the slide 16 the other twenty-cent escapement-wheel J², and the slide 17 the fifty-cent escapement-wheel J', it will be obvious that in order to cause a key representing any multiple of five up to ninety-five to operate the appropriate escapement-wheel or combination of escapement-wheels representing that value it is only necessary to so arrange the slots in the slides as that when the particular key is pressed its wedge-shaped projection will operate upon and shift longitudinally as many slides as will move the escapement-wheels representing the desired combination—for instance, the five-cent key must move the five-cent slide 13, and that only, the ten-cent key the ten-cent slide 14, and that only, the fifteen-cent key both the five-cent slide 13 and the ten-cent slide 14, the twenty-cent key the twenty-cent slide 15, and so on till we come to the ninety-five-cent key, which must move the fifty-cent slide 17, the twenty-cent slide 15, the second twenty-cent cent slide 16, and the five-cent slide 13. In like manner combinations are made of the slides of the dollar-registering mechanism, one of said slides representing one dollar, another two dollars, another four dollars, another five dollars, and the remaining one ten dollars.

In my prior patent, before referred to, each key was connected with only one escapement-wheel, and there were as many escapement-wheels as there were keys. By combining two or more escapement-wheels with a single operating-key, as I have done in my present machine, I am enabled to form combinations by which, on the cent side of the machine, the values of nineteen different operating-keys may be accurately registered on the registering-wheel with the employment of only five escapement-wheels and their co-operating detents. This part of my present invention constitutes one of the most valuable improvements upon my prior machine, and the essential feature of it consists in the combination of two or more escapements and their co-operating detents with a single key, so that when said key is operated both escapements will be disengaged from their detents and the sum of their movements transferred to the registering-wheel.

Instead of employing springs to return the slides to normal position after they have been moved outward by the action of the wedge-shaped projections on the keys, a swinging bar $K^{10}$, having wedge-shaped cams $K^{11}$ on its outer ends for co-operating with the ends of the slides, may be employed, as shown in Fig. 11. In this modification the swinging bar is designed to be lifted by the keys, and the wedge-shaped projections on the keys shift the slides outward as the wedge-shaped cams on the swinging bar are retracted. As the key returns to normal position the operation is reversed, the slide being driven in by the falling cam $K^{11}$.

As is usual in improved machines of this class, there is arranged above the keys and in rear of the shaft upon which they are pivoted the bar $A'$, Figs. 4, 5, and 16, extending transversely across and resting upon the tops of all the keys and connected by suitable arms $A^2$ to a pivot-shaft $A^3$, so as to be free to turn with the latter in its bearings. The rear edge of said transverse bar normally stands opposite horizontal slots $A^4$, made at or near the bases of projections $A^5$, formed on the tops of the keys, and when a key is pressed so as to raise its rear end the transverse bar is raised with it, and owing to the fact that the key and transverse bar are pivoted on different centers the edge of the transverse bar enters the slot $A^4$ of the key projection $A^5$ and during the rest of the upward movement of the key, and, in fact, till its first position has been resumed, the key and transverse bar remain securely locked together. As the transverse bar swings up it moves out over the projections $A^5$ of the unoperated keys and prevents any one of them from being raised till the key with which it is engaged is returned to normal position and released.

Connected to the transverse bar $A'$ at $A^6$ is a bell-crank lever $A^7$, pivoted at $A^8$ and having an arm $A^9$, which is adapted to bear upon one end of a pivoted lever $A^{10}$, Fig. 6, that carries at its opposite end a bolt $A^{11}$, by which the cash-drawer $A^{12}$ is locked. Whenever a key is operated, the arm $A^9$ of the bell-crank lever is depressed, thereby tilting the lever $A^{10}$ against the tension of its spring $A^{13}$ and raising the locking-bolt $A^{11}$ from engagement with its keeper $A^{14}$ in the drawer, thus allowing the drawer to be projected forward or opened by the action of a stout spring $A^{15}$, arranged behind it, as shown in Fig. 13. The lever $B^3$, by whose vibrations the spring-drum winding appliance of the registering mechanism is actuated, is connected, it will be remembered, by a pin-and-slot connection to the slide $B^6$, that works upon the guide-rod $B^7$, and the forward or return motion is given said lever and slide by the action of the spring $B^8$, as shown in Fig. 3. Now in order that the requisite backward or winding movement may be given said lever and slide I provide the slide with a downward projection or arm $B^9$, made long enough to extend down into the path of and behind the drawer $A^{12}$, so that each time the drawer is closed the said slide and lever $B^3$ will be actuated so as to wind up the spring-drums, while upon the opening of the drawer the spring $B^8$ will reset or restore the parts ready for the next operation.

In order that there be given the drawer in closing it an amount of motion sufficient to impart the proper length of stroke to the lever $B^3$, I have provided the drawer with an appliance which requires that when the drawer has once started to open it cannot be pushed backward or returned, but must continue to move outward until it is fully opened, thereby insuring a full stroke on the return. Such appliance is illustrated in Figs. 12 to 15, and consists of a guide or way $W$, secured to the case of the machine beneath the drawer and provided on its interior with a ratchet-bar $W'$, formed upon or secured to one of its sides at its rear end, and provided, further, with a longitudinal groove $W^2$ in its bottom, extending from end to end of it, as shown in Figs. 14 or 15. Within the longitudinal groove $W^2$ fits so as to freely move back and forth therein a slide $W^3$, which is formed with a recess $W^4$ in its top, near its middle, and has hung upon or pivoted to its side next the ratchet-bar $W'$ a pawl $W^5$, whose long arm is provided with a tooth $W^6$ and whose short arm is formed on its top with a cam-shaped recess $W^7$, as shown. Upon the bottom of the drawer is secured a bar $X$, that is adapted to slide back and forth within the stationary guide $W$, and is provided with a downwardly-projecting lug $X'$, which extends down within the recess $W^4$ of the plate or pawl carrier, and is further provided with a V-shaped projection $X^2$, which extends down within the cam-shaped recess $W^7$ of the pivoted pawl. The projecting lug $X'$ of the sliding bar $X$ is not so wide as the recess $W^4$ of the pawl-carrier $W^3$, and when the drawer is closed rests at the rear side of the recess $W^4$, as shown in Fig. 12. Consequently when the drawer and bar $X$ are moved outward there is at first a slight amount of lost motion between the lug $X'$ and the forward wall of the recess $W^4$, during which the V-shaped projection $X^2$ strikes the forward wall of the cam-recess $W^7$ and raises the rear toothed end of the pawl $W^5$ above the rear end of the ratchet-bar $W'$. As the drawer is pulled outward the pawl-tooth remains in this elevated position and free from the teeth of the ratchet-bar. If, however, before the pawl passes beyond the front end of the ratchet-bar, any attempt to close the drawer is made, the lost motion between the lug $X'$ on the bar $X$ and the rear wall of the recess $W^4$ in the pawl $W^3$ will cause the V-shaped projection $X^2$ on the bar X to release the pawl $W^5$ and permit the toothed rear end to drop into engagement with the ratchet-bar and prevent farther inward motion. After the drawer has been sufficiently opened to carry the pawl $W^5$ beyond the front end of the ratchet-bar the first inward movement of the drawer will release the pawl in the manner described, and its rear toothed end will drop below the front end of the ratchet-bar, and the drawer is free to be closed.

From this description it will be clear that in closing the drawer the toothed end of the pawl will pass beneath the ratchet-bar, as illustrated in Fig. 12, and not impede in the slightest the backward movement of the drawer, thereby enabling the drawer to be pushed in and automatically locked by the locking-bolt, as ordinarily, or pushed in part way and then opened; but after the drawer is fully pushed in and locked the moment it is again unlocked and starts to move outward the toothed end of the pawl will be lifted above the ratchet-bar, and while the drawer may continue its outward movement without obstruction any effort to push it back before it is fully opened will cause the pawl to dog into the ratchet-bar and hold the drawer fast. A backward movement of the drawer is thus insured each time sufficient to keep the spring-drums of the registering mechanisms always properly wound up.

It is desirable in machines of this class that when a key has commenced to move in one direction it shall be required to fully complete its movement in that direction before it can be returned, wholly or partially, to normal position or the starting-point; also, that when a key has so made a complete movement in one direction it shall be required to make a complete return movement back to starting-point before it can be again advanced, wholly or partially, and, while I do not claim to be the original projector of the broad idea of providing appliances for effecting such desirable results, I have in the construction of this machine devised special appliances which admirably accomplish the object, and which I believe to be new. I will now describe them.

Pivoted to one side of the frame of the machine at Y is a swinging arm $Y'$, Figs. 3, 4, and 5, that is provided with a ratchet-segment $Y^2$, whose teeth point upward, and with another ratchet-segment $Y^3$, whose teeth point downward. The ratchet-segment $Y^2$, which for brevity I will hereinafter call the "ratchet" $Y^2$ simply, is adapted to co-operate with a tooth Z on one of the arms $A^2$ of the transverse bar $A'$, and the ratchet $Y^3$ is adapted to co-operate with another tooth $Z'$ on said arm $A^2$. A pin $Y^4$ projects from the outer side of the arm Y into the path of the winding-lever $B^3$, and when said lever is thrown backward, as it is when the cash-drawer is closed, it strikes said pin $Y^4$ and, overcoming the tension of a forward-drawing spring $Y^5$, swings said arm Y backward, so as to throw both its ratchets $Y^2$ and $Y^3$ out of engagement with their co-operating teeth on the arm of the transverse bar. When, however, a key is pressed and the drawer is liberated, the winding-lever $B^3$ swings forward, thus releasing the arm Y, which thereupon also swings forward until its foremost ratchet $Y^2$ comes in contact with the tooth Z on the transverse bar, which latter by this time has become locked to the operated key and is rising with it. As the rear end of the key and transverse bar continue to rise the tooth Z slips easily over the upwardly-pointing teeth of the said ratchet $Y^2$; but the moment the pressure on the key ceases or a contrary movement of the key is attempted said ratchet catches said tooth and the transverse bar and ratchet become locked together. Just before the rear end of the key reaches the limit of its upward movement the tooth Z passes off the ratchet $Y^2$ and the spring $Y^5$ draws the swinging arm $Y'$ forward till it brings the second ratchet $Y^3$, with the downwardly-pointed teeth, up against the other tooth $Z'$ of the transverse bar, and when by the removal of pressure from its outer end the inner end of the key and the transverse bar move downward to first position the said tooth $Z'$ runs easily over the ratchet $Y^3$, which offers practically no obstruction to its motion; but if before the key has fully returned an attempt is made to again operate it the tooth $Z'$ will dog into the ratchet $Y^3$ and arrest the movement. The ratchet $Y^3$ remains in engagement with the tooth $Z'$ until the closing of the cash-drawer causes the swinging arm bearing said ratchet to be swung back out of the way. It will thus be seen that the ratchet $Y^3$ by thus holding down the transverse bar till the drawer is closed operates to prevent the operation of any key of the machine while the drawer remains open.

In establishments where machines of this class are used it is sometimes desirable to open the cash-drawer for the purpose of withdrawing a sum of money and substituting therefor a check indicating the amount taken out or of withdrawing such check and returning the money, or the like, without making a registration upon the ordinary registering devices. Therefore, to make provision for such use of the present machine and yet keep a record the number of times the machine is so used, I provide an extra key $Z^3$, preferably alongside the ten-dollar key, which extra key has no connection with the slides which operate the registering mechanism hereinbefore described, though it is adapted to actuate a tablet-rod bearing a tablet lettered "check" and is operative upon the transverse bar, so as to sound the alarm apparatus when actuated, and I arrange in connection with said extra key a separate registering mechanism consisting of a series of wheels 30 31 32, Figs. 20 and 21, mounted loosely upon a shaft 33, and another series of co-operating wheels 34 and 35, mounted the first rigidly and the second loosely upon a shaft 36, and I also secure to the shaft 36 a ratchet-wheel 37, with which is adapted to engage a spring-pawl 38, mounted upon a plunger 39, whose lower end bears on top of the extra key $Z^3$. Each time the key $Z^3$ is operated to open the cash-drawer the plunger 39 is caused to rise against the tension of the spring 50 and its pawl advances the shaft 36 the distance represented by the length of one ratchet-tooth, which advance is recorded on the wheel 30 and transferred in due course to the wheels 31 and 32. A spring 40 prevents any backward movement of the ratchet-wheel 37, except when said spring is thrown out, as it may be, by a cam-arm 41, mounted on the shaft 36, for the purpose of resetting the register.

I have shown the toothed rods and indicating-tablets and the means for operating them, also the bell and bell-sounding mechanism, but have not deemed it necessary to describe said parts of the machine, as they do not differ essentially from those now in general use.

The gears 2, 5, 8, and 11, that are hung in the swinging frame $T^3$, constitute a register of a day's transactions, and at the end of each day the proprietor takes off the amount indicated by them and turns them back to zero, ready for the next day's operations. The gears 1 3 4 6 7 9 10, however, are locked by the cross-bar $T^6$, as we have seen, whenever the said gears 2, 5, 8, and 11 are reset or turned back to zero, and being themselves never reset or turned back, but continuing always to rotate forward in the same direction, they constitute a total register of all sales for an indefinite period. They are to be appropriately numbered, and if greater range is required other registering-gears may be added to lengthen the train.

Having thus described my invention, what I claim as new is—

1. In a registering-machine, the combination, with a revoluble shaft, of a detent-support and a toothed escapement-wheel mounted upon and rotating with the shaft and laterally movable thereon toward and from the relatively stationary detent, substantially as described.

2. In a registering-machine, the combination, with a revoluble shaft, of a detent-support mounted upon said shaft, and a toothed escapement-wheel mounted upon and moving with said shaft and laterally movable toward and from the relatively stationary detent-support, substantially as described.

3. In a registering-machine, the combination of a revoluble shaft and detent-wheel mounted loosely thereon, and a toothed escapement-wheel mounted upon and moving with the shaft and laterally movable upon the same toward and from the relatively stationary detent, substantially as described.

4. The combination, with a revoluble shaft and a registering-wheel secured to it, of a detent-support and a toothed escapement-wheel mounted upon and moving with the shaft and laterally movable thereon toward and from the relatively stationary detent-support, substantially as described.

5. In a registering-machine, the combination, with a revoluble shaft, of a toothed escapement-wheel revolving with said shaft and laterally movable thereupon, a series of loosely-mounted detent-wheels, with one of which the before-mentioned escapement-wheel co-operates, a series of escapement-wheels mounted upon the hubs of said detent-wheels and connected thereto so as to revolve therewith, yet capable of independent lateral motion thereupon, and a fixed detent co-operating with the last escapement-wheel of the series, substantially as described.

6. In a registering-machine, the combination, with the revoluble shaft, of a toothed escapement-wheel revolving with said shaft and laterally movable thereupon, a series of loosely-mounted detent-wheels, with one of which said escapement-wheel co-operates, a series of escapement-wheels having different numbers of teeth mounted upon the hubs of said detent-wheels and connected thereto so as to revolve therewith, yet be capable of independent lateral motion thereupon, and a fixed detent co-operating with the last escapement-wheel of the series, substantially as described.

7. In a registering-machine, the combination, with a revoluble shaft, of a toothed escapement-wheel mounted upon said shaft and connected thereto by a spline-and-groove connection, a series of detent-wheels loosely mounted upon said shaft, with one of which said escapement-wheel co-operates, a series of escapement-wheels mounted upon the hubs of said detent-wheels and connected thereto by a spline-and-groove connection, and a relatively-fixed detent co-operating with the last escapement-wheel of the series, substantially as described.

8. In a registering-machine, the combination, with a revoluble shaft, of a registering-wheel mounted thereon, a toothed escapement-wheel also mounted thereon and connected thereto by a spline-and-groove connection, a series of detent-wheels loosely mounted on said shaft, with one of which the said escapement-wheel co-operates, a series of escapement-wheels mounted upon the hubs of said detent-wheels and connected thereto by a spline-and-groove connection, and a relatively-fixed detent co-operating with the last escapement-wheel of the series.

9. In a registering-machine, the combination, with the revoluble shaft and a motor connected therewith, of a registering-wheel mounted upon said shaft, a toothed escapement-wheel also mounted upon said shaft and connected thereto by a spline-and-groove connection, a series of detent-wheels loosely mounted on said shaft, with one of which the said escapement-wheel co-operates, a series of escapement-wheels mounted upon the hubs of said detent-wheels and connected thereto by a spline-and-groove connection, and a relatively-fixed detent co-operating with the last escapement-wheel of the series, substantially as described.

10. In a registering-machine, the combination, with the revoluble shaft, of a registering-wheel mounted thereon, a toothed escapement-wheel also mounted thereon and connected thereto by a spline-and-groove connection, a series of detent-wheels loosely mounted on said shaft, with one of which said escapement-wheel co-operates, a series of escapement-wheels mounted upon the hubs of said detent-wheels and connected thereto by a spline-and-groove connection, a relatively-fixed detent co-operating with the last escapement-wheel of the series, a series of finger-keys, and connections between said keys and the several escapement-wheels, whereby upon pressing upon a key a corresponding escapement-wheel will be moved laterally so as to be released from its co-operating detent and permit the shaft and the registering-wheel thereupon to advance, substantially as described.

11. In a registering-machine, the combination of a series of operating-keys, a series of indicators positively operated thereby, a spring-motor controlled by the operating-keys, a register actuated by the motor upon the operation of a key, and a cash-drawer co-operating with the motor to put the same under tension when the drawer is closed.

12. In a registering-machine, the combination, with the revoluble shaft and the detent-wheels and escapement-wheels mounted thereon, as described, of the motor for actuating said shaft, a cash-drawer, and intermediate devices for winding the motor by the movements of the cash-drawer.

13. In a registering-machine, the motor-shaft, the ratchet-wheel on its end, and the vibratory lever carrying the pawl for engaging said ratchet-wheel and projecting in the path of the cash-drawer, in combination with said cash-drawer, whereby the movement of the drawer vibrates the lever and turns the motor-shaft.

14. In a registering-machine, the motor-shaft, the ratchet-wheel on its end, and the vibratory lever carrying the pawl for engaging said ratchet-wheel and projecting in the path of the cash-drawer, in combination with said cash-drawer and with means for retracting the lever when released from the drawer, substantially as described.

15. In a registering-machine, the combination of a series of operating-keys, a series of indicators positively operated thereby, a registering mechanism, a motor controlled by the operating-keys for actuating the same, a cash-drawer, mechanism for winding the motor by the movements of the cash-drawer, and mechanism intermediate the keys and cash-drawer for unlocking said drawer upon the operation of a key, substantially as described.

16. In a registering-machine, the combination of a series of finger-keys, a series of indicators positively operated thereby, a registering mechanism operated by the movement of any one of said keys, a motor controlled by the keys for actuating said registering mechanism, a cash-drawer, mechanism for winding the motor by the movements of the drawer, and mechanism intermediate the keys and drawer for unlocking said drawer upon the operation of a key.

17. In a registering-machine, the combination, with a revoluble shaft and the detent-wheels and escapement-wheels mounted thereon, as described, of the series of finger-keys, the slides operated by said keys, and means, substantially such as described, for communicating the motion of the slides to the escapement-wheel, substantially as described.

18. In a registering-machine, the combination, with the motor, the revoluble shaft actuated thereby, the detent-wheels, escapement-wheels, and registering-wheel mounted on said shaft, as described, of the series of finger-keys, the slides operated thereby, and the connections between the slides and the escapement-wheels, substantially as described.

19. In a registering-machine, the combination of the motor, the revoluble shaft actuated thereby, the detent-wheels, escapement-wheels, and registering-wheel mounted on said shaft, as described, the series of finger-keys, the slides operated thereby, and the connections between the slides and the escapement-wheels, with the cash-drawer and intermediate mechanism for winding the motor by the operation of said drawer, substantially as described.

20. In a registering-machine, the combination of the motor, the revoluble shaft actuated thereby, the detent-wheels, escapement-wheels, and registering-wheel mounted on said shaft, as described, a series of finger-keys, the slides operated thereby, and the connections between the slides and the escapement-wheels, with the cash-drawer, mechanism for releasing the drawer by the operation of a key, and mechanism for winding the motor by the movements of the drawer, substantially as described.

21. In a registering-machine, the combination, with the finger-keys and the slides operated thereby, of a cam for returning the slide or slides to normal position after having been shifted by the finger-keys, substantially as described.

22. In a registering-machine, the combination, with the finger-keys and the slides operated thereby, of a gravitating cam adapted to be lifted by the depression of a key, and upon the return of said key to shift said slides back to normal position, substantially as described.

23. In a registering-machine, the combination, with the motor, the revoluble shaft actuated thereby, the detent-wheels, escapement-wheels, and registering-wheel mounted on said shaft, as described, of the series of finger-keys, the slides operated thereby, the cam for returning the slides, and the connections between the slides and the escapement-wheels, substantially as described.

24. In a registering-machine, the combination, with the motor-shaft having the ratchet-wheel on its end, of the vibratory lever carrying the pawl, the slide to which the lower end of said lever is connected by the pin-and-slot connection, and the guide for said slide, substantially as described.

25. In a registering-machine, the combination, with a relatively stationary detent having two contact-faces, of a revoluble toothed escapement-wheel movable laterally toward and from the said detent, so as to engage one or the other of the contact-faces thereof, substantially as described.

26. In a registering-machine, the combination, with the revoluble shaft of the cent-registering mechanism and the revoluble shaft of the dollar-registering mechanism, of an escapement-wheel mounted upon and revolving with the shaft of the dollar-registering mechanism, as described, and a detent shifted by the cent-registering shaft at each complete revolution of the same to permit an advance of the shaft of the dollar-registering mechanism, substantially as described.

27. In a registering-machine, the combination, with the revoluble shaft of the cent-registering mechanism and the revoluble shaft of the dollar-registering mechanism, and with the motors for said shafts, of an escapement-wheel mounted upon and revolving with the shaft of the dollar-registering mechanism, as described, and a detent shifted by the shaft of the cent-registering mechanism at each complete revolution of the latter to permit an advance of the shaft of the dollar-registering mechanism, substantially as described.

28. In a registering-machine, the combination, with the revoluble shaft of the cent-registering mechanism and the revoluble shaft of the dollar-registering mechanism, of an escapement-wheel mounted upon and revolving with the shaft of the dollar-registering mechanism, a detent for engaging said escapement-wheel, and a cam or groove on the shaft of the cent-registering mechanism for shifting said detent, whereby upon a complete revolution of the shaft of the cent-registering mechanism the detent will be shifted to permit an advance of the shaft of the dollar-registering mechanism, substantially as described.

29. In a registering-machine, the combination, with the revoluble shaft of the cent-registering mechanism and the revoluble shaft of the dollar-registering mechanism, of an escapement-wheel mounted upon and revolving with the shaft of the dollar-registering mechanism, a laterally-movable detent having two contact-faces, as described, and a groove or cam on the shaft of the cent-registering mechanism for shifting said detent at each complete revolution of said last-mentioned shaft, so as to release the escapement-wheel from one contact-face of the detent and permit it to engage with the other contact-face of said detent, thereby permitting an advance of the shaft of the dollar-registering mechanism, substantially as described.

30. In a registering-machine, the combination, with the revoluble shaft of the cent-registering mechanism and the revoluble shaft of the dollar-registering mechanism, of an escapement-wheel mounted upon and revolving with the shaft of the dollar-registering mechanism, a detent for engaging said escapement-wheel, mounted upon a shifting support, and a head or projection also mounted on said shifting support and engaging with a right and left spiral groove on the shaft of the cent-registering mechanism, substantially as described.

31. In a registering-machine, the combination, with the shaft of the cent-registering mechanism having the right and left spiral groove, and the shaft of the dollar-registering mechanism provided with the escapement-wheel moving with it, of the detent P, having the contacts $p$ $p'$, the sliding rod Q, upon which said detent is mounted, the socket $S^4$, also on said rod, and the head $S^3$, working in said socket and engaging with the spiral grooves of the shaft of the cent-registering mechanism, substantially as described.

32. In a registering-machine, the combination, with the revoluble shaft of the cent-registering mechanism and the revoluble shaft of the dollar-registering mechanism, of a series of escapement-wheels and a co-operating series of detent-wheels mounted upon the shaft of the dollar-registering mechanism, the finger-keys, and connections for shifting said escapement-wheels, the additional escapement-wheel on the shaft of the dollar-registering mechanism, and the detent for said wheel actuated by the shaft of the cent-registering mechanism at each complete movement of the latter, substantially as described.

33. In a registering-machine, the combination, with the revoluble shaft of the cent-registering mechanism, the series of escapement-wheels and detent-wheels arranged upon said shaft, as described, the finger-keys, and connections for operating said series of cent escapement-wheels, of the shaft of the dollar-registering mechanism, its series of escapement-wheels and co-operating detent-wheels, the finger-keys and connections for operating said series of dollar escapement-wheels, the additional escapement-wheel on the shaft of the dollar-registering mechanism, and the detent for said last-mentioned escapement-wheel, operated by the shaft of the cent-registering mechanism at each complete revolution of the latter, substantially as described.

34. In a registering-machine, the combination, with a revoluble shaft of the cent-registering mechanism and the revoluble shaft of the dollar-registering mechanism, and with a motor for said shaft, of an escapement-wheel mounted upon and revolving with the shaft of the dollar-registering mechanism, as described, a detent shifted by the shaft of the cent-registering mechanism at each complete revolution of the latter, and a total-register geared to the shaft of the dollar-registering mechanism, substantially as described.

35. In a registering-machine, the combination, with the revoluble shaft of the cent-registering mechanism and the revoluble shaft of the dollar-registering mechanism, of a series of escapement-wheels and a co-operating series of detent-wheels mounted upon the shaft of the dollar-registering mechanism, the finger-keys, and connections for shifting said escapement-wheels, the additional escapement-wheel on the shaft of the dollar-registering mechanism, the detent for said wheel actuated by the shaft of the cent-registering mechanism at each complete movement of the latter, and a total-register geared to the shaft of the dollar-registering mechanism, substantially as described.

36. In a registering-machine, the combination, with the revoluble shaft of the cent-registering mechanism, a series of escapement and detent wheels arranged upon said shaft, as described, the finger-keys, and connections for operating said series of cent escapement-wheels, of the shaft of the dollar-registering mechanism, its series of escapement-wheels and co-operating detent-wheels, finger-keys and connections for operating said series of dollar escapement-wheels, the additional escapement-wheel on the shaft of the dollar-registering mechanism, the detent for said last-mentioned escapement-wheel operated by the shaft of the cent-registering mechanism at each complete revolution of the latter, and the total-register geared to the dollar-shaft, substantially as described.

37. In a registering-machine, the combination, with the upper series of wheels of the total-register, mounted loosely upon a common axis in a fixed support, of the co-operating lower series of wheels mounted upon a shaft in a movable support, and a lock for locking the upper wheels from movement when the lower ones are disengaged from them, substantially as described.

38. In a registering-machine, the combination, with the upper series of wheels of the total-register, mounted loosely upon a common shaft, of the co-operating lower series of wheels and the pivoted frame in which said lower series of wheels are mounted, provided with a locking cross-bar which engages with the upper series of wheels and prevents their displacement when said frame is swung down to throw the two series of wheels out of mesh, substantially as described.

39. In a registering-machine, the combination, with the two series of wheels of the total-register, of the pivoted frame carrying the lower series of said wheels and provided with the locking cross-bar, and the means for adjusting and holding said frame, substantially as described.

40. In a registering-machine, the combination, with the lower series of wheels of the total-register and the pivoted frame in which they are mounted, of the spring-pressed levers, which bear with frictional contact against said wheels when the frame is swung down, and the cross-bar for automatically throwing said levers out of contact with the wheels when the frame is swung up, substantially as described.

41. In a registering-machine, a movable key-arrester provided with a ratchet having upwardly-pointing teeth, in combination with the finger-keys, the transverse bar extending across the keys and provided with a tooth for engaging said ratchet and the cash-drawer, and intermediate connections for holding the said key-arrester out of action when the drawer is closed, substantially as described.

42. In a registering-machine, a movable key-arrester provided with a ratchet having upwardly-pointing teeth, in combination with the finger-keys and the transverse bar extending across the keys and provided with a tooth for engaging said ratchet, the cash-drawer and intermediate connections for holding the key-arrester out of action when the drawer is closed, and means, such as a spring, for throwing the key-arrester into action when the drawer is opened, substantially as described.

43. In a registering-machine, a movable key-arrester provided with a ratchet having upwardly-pointing teeth, in combination with the finger-keys and the transverse bar extending across the keys and provided with a tooth for engaging said ratchet, the cash-drawer and intermediate connections for holding the key-arrester out of action when the drawer is closed, and means, such as a spring, for throwing the key-arrester into action when the drawer is opened, and connections, such as described, for unlocking the drawer upon the depression of a key, substantially as described.

44. In a registering-machine, the key-arrester provided with the ratchet having upwardly-pointing teeth, and with the second ratchet having downwardly-pointing teeth, of the transverse bar extending across the tops of the keys, provided with teeth co-operating, respectively, with said ratchets, substantially as described.

45. In a registering-machine, the combination, with the key-arrester provided with the ratchet having upwardly-pointing teeth, and with the second ratchet having downwardly-pointing teeth, of the series of finger-keys and the transverse bar extending over the tops of said keys and provided with teeth for engaging, respectively, the said two ratchets, substantially as described.

46. In a registering-machine, the key-arrester provided with the two ratchets, one having upwardly-pointing teeth and the other having downwardly-pointing teeth, as described, of the pivoted transverse bar extending across the tops of the keys and provided with teeth for co-operating, respectively, with the ratchets, and the finger-keys provided with the upward projections, slotted as described, for co-operating with the transverse bar, substantially as described, and for the purpose specified.

47. In a registering-machine, the combination, with the key-arrester having the two ratchets, one with teeth pointing upward and the other with teeth pointing downward, and the transverse bar extending across the tops of the keys and provided with teeth for co-operating with said ratchets, respectively, of the vibrating lever and its connections, and the cash-drawer for holding the key-arrester normally out of action, substantially as described.

48. In a registering-machine, the combination, with the key-arrester having the two ratchets, one with the teeth pointing upward and the other with the teeth pointing downward, and the transverse bar extending across the tops of the keys and provided with teeth for co-operating with said ratchets, respectively, of the vibrating lever and its connections, the cash-drawer for holding the key-arrester normally out of action, and means for swinging the key-arrester forward into action when the drawer is open, substantially as described.

49. In a registering-machine, the combination, with the key-arrester having the two ratchets, one with teeth pointing upward and the other with teeth pointing downward, the transverse bar extending across the tops of the keys and provided with teeth for co-operating with said ratchets, respectively, of the vibrating lever and its connections, the cash-drawer for holding the key-arrester normally out of action, means, such as a spring, for throwing the key-arrester forward into action when the drawer is released, and a finger-key and intermediate connections for releasing the drawer, substantially as described.

50. In a registering-machine, the combination, with the key-arrester having the two ratchets, one with the teeth pointing upward and the other with the teeth pointing downward, of the transverse bar extending across the tops of the keys and provided with teeth for co-operating with said ratchets, respectively, and means, such as a spring, for holding one ratchet in engagement with its co-operating tooth while the transverse bar is moving upward and for advancing the other ratchet into engagement with its co-operating tooth before said transverse bar begins to move downward, substantially as described.

51. In a registering-machine, the combination of a series of operating-keys, indicators operated thereby, a spring-motor controlled by the operating-keys, a register actuated by the motor, and an inwardly and outwardly movable money-drawer co-operating with the spring-motor to put the same under tension when the drawer is closed, substantially as described.

52. In a registering-machine, the combination of a series of operating-keys, indicators operated thereby, a spring-motor controlled by the operating-keys, a register actuated by the motor, an inwardly and outwardly movable money-drawer co-operating with the spring-motor to put the same under tension when the drawer is closed, and a rack and pawl arrester co-operating with the drawer to prevent its being closed after being partially opened until opened a predetermined distance, substantially as described.

53. In a registering-machine, the combination of a cash-drawer, a spring-motor put under tension by the closing of the drawer, a register actuated by said motor, a pawl connected to and moving with the drawer, and a stationary ratchet with which said pawl engages to prevent the return of the drawer after it begins to move outward, substantially as described.

54. In the herein-described registering-machine, the combination, with the vibratory lever of the motor-winding mechanism, of the drawer, a pawl connected thereto and moved therewith, and a stationary ratchet with which said pawl engages to prevent the return of the drawer after it begins to move outward, substantially as described.

55. In a registering-machine, the combination of a cash-drawer, a spring-motor put under tension by the closing of the drawer, a register actuated by said motor, a pawl connected to and moving with the drawer, and a stationary ratchet with which said pawl engages to prevent the return of the drawer after it begins to move outward, and means for automatically throwing said pawl out of the path of the ratchet after the drawer has moved outward the predetermined distance, thereby permitting the return of the drawer without obstruction, substantially as described.

56. In a registering-machine, the combination of a cash-drawer, a spring-motor put under tension by the closing of the drawer, a register actuated by said motor, a pawl connected to and moving with the drawer, a stationary ratchet with which said pawl engages to prevent the return of the drawer after it begins to move outward, and means for automatically throwing said pawl out of the path of the ratchet after the drawer has moved outward the predetermined distance and for automatically throwing said pawl again in the path of said ratchet after the drawer has been fully closed and before it is again opened, substantially as described.

57. In the herein-described registering-machine, the combination, with the guide having the ratchet-bar on its inner side, and the pawl-carrier having the pivoted pawl and provided with the central recess, of the bar on the drawer provided with the lug for entering the recess of the pawl-carrier, and with the projection for acting upon the pawl to raise and lower the toothed end of the latter, accordingly as the drawer is pulled outward or pushed inward, substantially as described.

58. In a registering-machine, the combination of the check-key $Z^3$, the drawer, and intermediate mechanism for unlocking the drawer, with the plunger 39, the pawl carried thereby, and the ratchet-wheel and connected registering-train, substantially as described, and for the purpose specified.

59. In a registering-machine, the combination of a detent and a relatively-rotatable toothed escapement-wheel co-operating therewith, both mounted upon the same axis, and one being laterally movable toward and from the other, substantially as described.

60. In a registering-machine, the combination of a detent and a laterally-movable and relatively-rotatable toothed escapement-wheel co-operating therewith, substantially as described.

61. In a registering-machine, the combination of a laterally-movable revoluble escapement-wheel, a register connected therewith, and a co-operating relatively non-revoluble detent, substantially as described.

62. In a registering-machine, the combination, with a revoluble registering-wheel and a laterally-movable escapement-wheel carried thereby and revolving therewith, of a relatively non-revoluble detent co-operating with the escapement-wheel, substantially as described.

63. In a registering-machine, the combination, with a revoluble shaft, of a detent and a co-operating escapement, both mounted upon the shaft, and one rotating therewith and one laterally movable toward and from the other, substantially as described.

64. In a registering-machine, the combination of a motor, a revoluble shaft driven thereby, a registering-wheel secured upon said shaft, and a detent and co-operating escapement, both mounted upon the shaft, and one rotating therewith and one laterally movable thereon toward and from the other, substantially as described.

65. In a registering-machine, the combination of a motor, a revoluble shaft and registering-wheel driven thereby, an escapement mechanism normally holding said motor in check, and a series of keys of different values for operating the escapement mechanism to release and arrest the motor, substantially as described.

66. In a registering-machine, the combination of a motor, a revoluble shaft and registering-wheel driven thereby, a series of detents and co-operating escapements normally holding said motor in check, and a series of operating-keys for disengaging the escapements from their respective detents to release the motor, substantially as described.

67. In a registering-machine, the combination of a motor, a revoluble shaft and registering-wheel driven thereby, a series of escapement-wheels and a series of co-operating detents mounted upon said shaft, and a non-revoluble detent co-operating with the last escapement-wheel of the series, substantially as described.

68. In a registering-machine, the combination of a motor, a revoluble shaft and registering-wheel driven thereby, a series of laterally-movable escapement-wheels and a series of co-operating detents mounted upon said shaft, a non-revoluble detent co-operating with the last escapement-wheel of the series, and a series of operating-keys connected with the laterally-movable escapement-wheels for disengaging them from their co-operating detents, substantially as described.

69. In a registering-machine, the combination of a motor, a registering-wheel driven thereby, a train of detents and co-operating escapements holding the motor in check, and a single operating-key co-operating with two or more of such escapements and detents, substantially as and for the purpose described.

70. In a registering-machine, a motor, a revoluble shaft and a registering-wheel driven thereby, and two or more detents and co-operating escapements controlling the movement of the motor and combined with a single operating-key, whereby upon operating said single key all of said escapements are disengaged from their co-operating detents, for the purpose described.

71. In a registering-machine, the combination of a motor, a revoluble shaft and registering-wheel driven thereby, a series of detents and co-operating escapements mounted on said shaft, and a single operating-key connected with two or more of the escapements or detents, for the purpose described.

72. In a registering-machine, the combination of a motor, a revoluble shaft and registering-wheel driven thereby, a series of detents and co-operating laterally-movable escapement-wheels mounted upon the shaft, and a series of operating-keys, each connected with two or more of the escapement-wheels, whereby upon operating any one of such keys its connected escapement-wheels are disengaged from their respective detents, for the purpose described.

73. In a registering-machine, the combination of two motors, a cent-registering wheel driven by the first and a dollar-registering wheel driven by the second, and a detent and co-operating escapement controlling the movement of the second motor and arranged to be disengaged at predetermined intervals in the movements of the first motor and cent-registering wheel to release the second motor and permit it to turn the dollar-registering wheel, substantially as and for the purpose described.

74. In a registering-machine, the combination of the two motors, the cent-registering wheel driven by the first and the dollar-registering-wheel driven by the second, an escapement connected with the second motor, and a co-operating detent disengaged from the escapement at predetermined intervals in the movements of the cent-registering wheel to permit the second motor to turn the dollar-registering wheel, substantially as described.

75. In a registering-machine, the combination of two trains of wheels mounted upon parallel axes and capable of being disengaged from each other, and a lock which automatically locks one train when the other is disengaged from it, substantially as and for the purpose described.

76. In a registering-machine, the combination of the gears 1, 3 4, 6 7, and 9 10, mounted on the shaft T, and the gears 2, 5, and 8, mounted on the parallel shaft $T^2$, each meshing with the preceding gear of the upper set and carrying a transfer locking-disk $a$, having a tooth $a'$ on its periphery and arranged with its periphery normally engaging two of the teeth of the succeeding gear of the upper set, substantially as and for the purpose described.

HUGO COOK.

Witnesses:
HENRY THEOBALD,
EDWARD RECTOR.